United States Patent [19]

Baas

[11] Patent Number: 4,924,454
[45] Date of Patent: May 8, 1990

[54] SERVO APPARATUS WITH OFFSET COMPENSATION

[75] Inventor: Dieter Baas, Kehl, Fed. Rep. of Germany

[73] Assignee: Deutsche Thomson-Brandt GmbH, Villingen-Schwenningen, Fed. Rep. of Germany

[21] Appl. No.: 250,248

[22] Filed: Sep. 27, 1988

[30] Foreign Application Priority Data

Sep. 30, 1987 [DE] Fed. Rep. of Germany ....... 3732924

[51] Int. Cl.$^5$ ................................................. G11B 7/00
[52] U.S. Cl. ................................. 369/44.11; 369/107; 369/44.21
[58] Field of Search ..................... 358/342; 369/43–47, 369/53, 54, 107; 250/201 DF

[56] References Cited

U.S. PATENT DOCUMENTS 4,232,201  11/1980  Canino .................................. 369/44
4,707,817  11/1987  Yoshio .................................. 369/46

FOREIGN PATENT DOCUMENTS 58-53030  3/1983  Japan .
60-61925  4/1985  Japan .

Primary Examiner—Robert L. Richardson
Attorney, Agent, or Firm—Joseph S. Tripoli; Peter M. Emanuel; Thomas F. Lenihan

[57] ABSTRACT

A servo loop arrangement for the reproduction of data from a record medium has interleaved pulse trains of opposite polarity pulses applied to it to add to the servo loop control signal which undesirably includes an offset voltage. The resultant increasing opposite polarity changes in the control signal in successive pulse train intervals are threshold detected. The numbers of opposite polarity pulses required to reach the threshold values are compared and any difference in number is converted to a compensation signal which is added to the servo loop to compensate for the offset voltage.

3 Claims, 1 Drawing Sheet

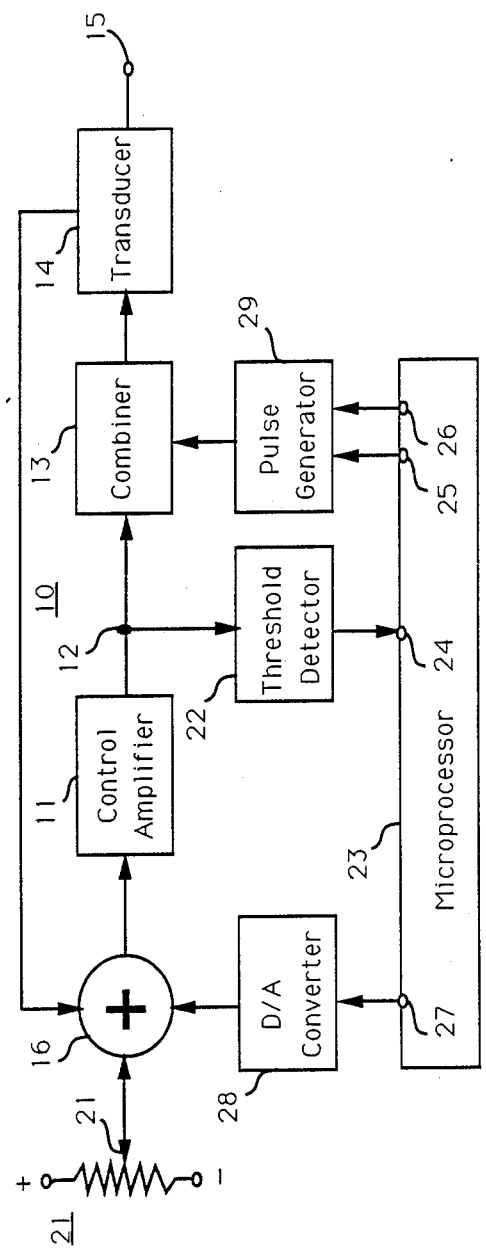

SERVO APPARATUS WITH OFFSET COMPENSATION

This invention relates to apparatus for controlling the reproduction of data and more particularly to apparatus for compensating for offset voltage for the servo loop of a transducer which is used for picking up information from the data tracks of a record medium.

In recent years, a number of products have emerged in the commercial and consumer areas which utilize a pickup transducer including optics for directing and controlling light beams for picking up signals contained in light reflected from a record on which data have previously been impressed. Examples of such arrangements are CD audio players, optical video record players and combinations of the two. Basically, the optical pickup device consists of a laser diode which creates the light beams, several lenses, a prism beam splitter and a photodetector. The typical operation and function of such an optical detecting device is described in Electonic Components and Applications, Volume 6, No. 4, 1984, pp. 209-215.

In a CD player, for example, the light beam emitted by the laser diode is focused on a CD record using lenses and from the record the light is reflected to a photodetector. The electrical output signal of the photodetector is representative of the recorded data. The audio data stored on the CD record and the actual value for the focus and for the track control circuts are also obtained. In the above referenced article, the actual value for the focus control signals is referred to as the focusing error and the actual value of the track control signal is referred to as the radial tracking error.

In the case of the focus control circuit, an inductance serves as the regulating unit to maintain focus. The magnetic field of the inductance moves an objective lens along its optical axis. The focus control servo loop causes the light beam emitted by the laser diode to always be focused on the CD record. This is accomplished by comparing the focusing error voltage with the reference voltage which is indicative of optimum focus condition and moving the objective lens to minimize the focusing error.

The track control circuit acts to insure that the optical assembly is always optimally positioned over the recorded tracks on the disc record in a radial direction in the audio and video players. The radial drive is constructed with a coarse drive and a fine drive mechanism. The coarse drive may be built on a spindle extending in a radial direction parallel to the disc record. On this spindle the total optical detecting device consisting of the laser diode, the lenses, the prism beam splitter and the photodetector can be shifted radially. By means of the fine drive, the light beam can be tilted in a radial direction about a small angle, which can be preset in such a way that the light beam can move along a radius of the record caused by this tilted motion to maintain optimum tracking. The tracking control circuit also includes a servo loop to control the tilting motion.

The various servo loops utilized in these optical players utilize a control amplifier to develop a control signal to control the regulating unit to maintain optimum signal playback conditions. The control amplifier is subject to an undesirable offset voltage, the magnitude of which depends on the temperature of the amplifier and also to long term drift of the elements making up the amplifier. The long term drift is caused by aging of the amplifier and its components.

In order that the signal data reproduction not be disturbed by the offset voltages of the control amplifiers in the servo loops, a compensation of the offset voltages is necessary. This may be done at the factory by manual adjustment of potentiometers provided in the servo loops. However, this compensation is only approximate because variations of the offset voltage caused by the different temperature and aging conditions cannot be predicted in advance.

In accordance with the invention, apparatus is provided for the reproduction of data from the data tracks of a record medium.

The apparatus includes a servo loop comprising a transducer means disposed for picking up data from the data tracks and converting this data into an electrical signal, a source of reference signal, control means coupled to the source of reference signal and to the transducer means and responsive to said reference signal and to said electrical signal for producing a control signal, the control signal being subject to an undesirable offset voltage.

The servo loop also includes means for coupling the control signal to the transducer means for disposing said transducer means relative to said data tracks in a manner to reduce the difference between said electrical signal and said reference signal.

Means are coupled to the control signal for generating successive trains of pulses of opposite polarity pulses, trains of one polarity of pulses being interleaved between trains of the other polarity pulses, for combining the pulse trains with the control signal for effecting a change in value of the control signal.

Measuring means are responsive to the changed control signal for determining when the changed control signal reaches predetermined thresholds in opposite directions in response to the pulses of opposite polarity and for measuring the duration of the successive opposite polarity pulse trains required to cause the changed control signal to reach the predetermined thresholds.

Means are coupled to the measuring means and to an input terminal of the control means for producing a compensation signal representative of a difference between the successive opposite polarity pulse train durations for altering the operation of the control means to compensate for the undesirable offset voltage.

The invention is useful in the servo loop of any transducing system in which a pickup device picks up data contained in data tracks contained on a record.

The invention is applicable to optical pickup device players and has utility in the focus error or tracking error control loops of such players. Such players may include audio or video optical players or a combination thereof.

The sole FIGURE of the drawing is a block diagram of apparatus for controlling the reproduction of data in accordance with an embodiment of the invention.

DESCRIPTION OF A PREFERRED EMBODIMENT OF THE INVENTION

A control amplifier 11 has an input terminal coupled to an output terminal of combiner 16. The output control signal of control amplifier 11 is coupled to a combiner 13. The output signal of combiner 13 is coupled to an input terminal of transducer 14. Transducer 14 in this embodiment can be an optical pickup assembly for a CD player to which reference was made above. In particular, the input signal can be coupled to an inductance within transducer assembly 14 to control the magnetic field of the inductance. The magnetic field is utilized to move an objective lens through which a laser beam passes so that the beam is optimally focused on a CD record disc associated with the CD player. An output terminal 15 provides a photodetected signal representative of the audio data contained on the data tracks of the CD record. This invention is not concerned with the details of subsequent processing of the audio representative electrical signal. The focus error electrical signal obtained from transducer 14 is coupled to an input of signal combiner 16. A potentiometer 21 has its wiper arm coupled to another input of signal combiner 16. The potentiometer is coupled between the positive and negative voltage sources and the voltage available at arm 21 is a reference voltage to which a focus error voltage of transducer 14 will be compared in combiner 16. The elements thus far described comprise a focus error servo loop such as may be used in a CD player.

Control amplifier 11 exhibits the undesirable offset voltage described above which is caused by temperature variation and component aging. The remainder of the elements in the figure are coupled to various elements of the basic described servo loop to compensate for offset voltage so that the servo loop may operate in its intended design region. This will insure most efficient operation of the servo loop so that the data extracted from terminal 15 of transducer 14 will be optimum.

The control signal obtained at an output terminal 12 of control amplifier 11 is coupled to an input terminal of a threshold detector 22. The output terminal of threshold detector 24 is coupled to an input port 24 of a microprocessor 23. It is assumed at the moment that the control signal at terminal 12 is of a negative potential large enough to exceed a negative threshold voltage within detector 22. At this occurrence, an output signal appears at port 24 and causes microprocessor 23 to generate a pulse train of positive pulses at an output port 25. These pulses are conditioned by a pulse generator 29 and coupled from its output terminal to another input terminal of combiner 13. These pulses when combined with the control signal produce a change in value of the control signal. In this instance, the control signal becomes more positive. The changed control signal is coupled to the transducer which reacts to the changed control signal which will result in a change in the focus error voltage coupled from the transducer 14 to combiner 16. This in turn produces a change in the voltage level of the signal coupled to control amplifier 11 and also results in a change in a positive direction of the control signal at output terminal 12 of control amplifier 11.

When a sufficient number of positive pulses have been combined with the control signal to raise the positive level of the control signal at terminal 12 to reach the positive threshold level of detector 22, the output signal of threshold level detector 22 coupled to input port 24 causes microprocessor 23 to stop producing positive pulses at output 25 and to start producing negative pulses at output port 26. At the same time, threshold detector 22 and microprocessor 23 act as a measuring apparatus to store within microprocessor 23 a count representative of the number of positive pulses produced at output port 25 and combined with the control signal before the positive threshold of detector 22 was reached.

In a similar but opposite polarity manner, the train of negative pulses now appearing at output port 26 of microprocessor 23 is conditioned by pulse detector 29 and coupled to combiner 13. These negative pulses effect a change in the negative direction of the control signal. The changed control signal is coupled to transducer 14 and the focus error voltage coupled to combiner 16 reflects this change. Consequently, output terminal 12 of control amplifier 11 will be changed in a negative direction. This direction will continue until such a time that the negative transducer level of transducer detector 22 is reached. This time the signal coupled to input port 24 of microprocessor 23 stops the generation of negative pulse at output port 26 and again starts producing a train of positive pulses at output port 25.

Thus at output ports 25 and 26, there is generated successive trains of pulses of opposite polarity. Trains of one polarity of pulses are interleaved between trains of the other polarity pulses.

A count representative of the number of negative pulses produced at output port 26 is also stored in microprocessor 23 and compared with the number corresponding to the positive pulses. Any difference between the two numbers results in the generation of a compensation signal representative of that difference at an output port 27 of microprocessor 23. The compensation signal, which in this embodiment is a binary signal, is coupled to an input of a D to A converter 28. An analog compensation signal corresponding to the input binary signal is coupled to another input terminal of combiner 16 for effecting a change in the level of the control signal coupled to the input terminal of control amplifier 11. This change is reflected in the control signal obtained at output terminal 12. The process of combining a train of positive pulses and a train of negative pulses with the control signal is continued for as long a time as it takes until the count representative of the number of positive pulses equals a count representative of the number of negative pulses as stored in microprocessor 23. When the counts are equal, it is an indication that the control amplifier has been conditioned by the compensation signal produced by the D to A converter 28 to the extent that the control signal at output terminal 12 of control amplifier 11 is at a midrange point and has overcome the effects of the undesirable offset voltage.

The invention thus results in the automatic ability of the focus error voltage servo loop in the CD player to compensate at any time for a change in the offset voltage. Thus, the need for separate manual potentiometers and manual adjustment thereof has been eliminated.

It is to be understood as discussed above that the invention may also be utilized, for example, in the tracking error servo loop of a CD or video disc player. In this situation, transducer 14 would have the tilt angle of the optical assembly adjusted by the servo loop to maintain optimum tracking. Furthermore, it is to be understood that this invention may be utilized in the servo loops of other types of data reproduction apparatus such as a video tape recorder. In such a utilization, the data tracks are contained on a tape instead of a disc and the positioning of the video heads relative to the tape data tracks may be controlled for optimum electrical signals obtained from the transducer, which is a magnetic recording and playback head assembly of the video tape recorder.

What is claimed is:

1. Apparatus for the reproduction of data from the data tracks of a record medium, comprising:

a servo loop including:
- (1) transducer means disposed for picking up data from said data tracks and converting said data into an electrical signal;
- (2) a source of reference signal;
- (3) control means coupled to said source of reference signal and to said transducer means and responsive to said reference signal and to said electrical signal for producing a control signal representative of a difference between said electrical signal and said reference signal, said control signal being subject to an undesirable effect voltage generated within said control means;
- (4) coupling means for coupling said control signal to said transducer means for disposing said transducer means relative to said data tracks in a manner to reduce the difference between said electrical signal and said reference signal;

means coupled to said control signal for generating successive trains of pulses of opposite polarity pulses, trains of one polarity of pulses being interleaved between trains of the other polarity pulses, for combining said pulse trains with said control signal for effecting a change in value of said control signal;

measuring means responsive to said changed control signal for determining when said changed control signal reaches predetermined thresholds in opposite directions in response to said pulses of opposite polarity and for measuring the duration of said successive opposite polarity pulse trains required to cause said changed control signal to reach said predetermined thresholds; and means coupled to said measuring means and to an input terminal of said control means for producing a compensation signal representative of a difference between said successive opposite polarity pulse train durations for altering the operation of said control means to compensate for said undesirable offset voltage.

2. Apparatus for the reproduction of data from the data track of a record medium according to claim 1 wherein said transducer is an optical pickup assembly and said servo loop comprises the focus error voltage servo loop for said optical pickup assembly.

3. Apparatus for the reproduction of data from the data track of a record medium according to claim 1 wherein said transducer is an optical pickup assembly and said servo loop comprises the tracking error voltage servo loop for said optical pickup assembly.

* * * * *